(12) United States Patent
Imai et al.

(10) Patent No.: US 8,964,089 B2
(45) Date of Patent: Feb. 24, 2015

(54) SYSTEMS AND METHODS FOR SIMULATED PREVIEW FOR PREFERRED IMAGE EXPOSURE

(75) Inventors: Francisco Imai, Mountain View, CA (US); Neil Y. Iwamoto, Mission Viejo, CA (US); Eric Riggert, Lake Forest, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 13/467,784

(22) Filed: May 9, 2012

(65) Prior Publication Data
US 2013/0300894 A1 Nov. 14, 2013

(51) Int. Cl.
*H04N 5/222* (2006.01)
*H04N 5/225* (2006.01)

(52) U.S. Cl.
USPC ............... 348/333.01; 348/333.11; 348/220.1

(58) Field of Classification Search
None
See application file for complete search history.

(56) References Cited

U.S. PATENT DOCUMENTS

| | | |
|---|---|---|
| 7,002,624 B1 | 2/2006 | Uchino |
| 7,646,148 B2 | 1/2010 | Hosoi |
| 7,969,504 B2 | 6/2011 | Matsuda |
| 2002/0076219 A1 | 6/2002 | Uchino |
| 2003/0052991 A1 | 3/2003 | Stavely |
| 2006/0008171 A1* | 1/2006 | Petschnigg et al. ........... 382/254 |
| 2007/0153113 A1 | 7/2007 | Ueda |
| 2008/0158376 A1 | 7/2008 | Miki |
| 2009/0010537 A1 | 1/2009 | Horie |
| 2009/0109316 A1 | 4/2009 | Matsui |
| 2010/0165163 A1 | 7/2010 | Matsuda |
| 2010/0177215 A1 | 7/2010 | Kita |
| 2010/0253797 A1 | 10/2010 | Arshavski |
| 2010/0283870 A1 | 11/2010 | Kleihorst |
| 2011/0026051 A1 | 2/2011 | Wang |
| 2011/0115941 A1 | 5/2011 | Kim |
| 2012/0224787 A1* | 9/2012 | Imai .............................. 382/274 |
| 2013/0002928 A1* | 1/2013 | Imai ......................... 348/333.11 |

FOREIGN PATENT DOCUMENTS

| | | | |
|---|---|---|---|
| AU | 2010/001282 | * | 4/2011 |
| JP | 2001086354 | | 3/2001 |
| JP | 2005354199 | | 12/2005 |
| JP | 2007081487 | | 3/2007 |
| KR | 20090080610 | | 7/2009 |

OTHER PUBLICATIONS

Hanhoon Park, Jong Il Park & Sang Hwa Lee Image Based Relighting of Moving Objects with Specular Reflection.*

* cited by examiner

*Primary Examiner* — Aung S Moe
*Assistant Examiner* — Euel Cowan
(74) *Attorney, Agent, or Firm* — Canon U.S.A., Inc. IP Division (57) ABSTRACT

Systems and methods for simulating an image exposure capture a first set of images of a scene; and generate a flash preview image based on the first set of images, an estimated scene spectral reflectance, an estimated spectral power distribution of the scene, and one or more flash device settings, wherein the flash preview image approximates a brightness and a color appearance of a final image of the scene captured while the scene is illuminated by a flash device according to the one or more flash device settings.

14 Claims, 7 Drawing Sheets

SYSTEMS AND METHODS FOR SIMULATED PREVIEW FOR PREFERRED IMAGE EXPOSURE

BACKGROUND

1. Field

The present disclosure relates to systems and methods for simulating the exposure of an image.

2. Background

When capturing images in an environment with insufficient light, a flash is often used to generate light or an ISO setting is increased. However, a flash may be too harsh, and thus may reduce color fidelity. Also, increasing ISO to provide more illumination does not provide more exposure to darker areas, and may also add more "noise" to an image. Furthermore, users are not be able to see a preview of a scene that shows how the scene would appear if captured in an image using the current camera settings and that is modified as the user adjusts the camera settings.

SUMMARY

In one embodiment, an image capturing device comprises a display unit configured to display an image; a light sensor configured to capture a first set of images of a scene; and one or more processors configured to cause the device to generate a flash preview image based on the first set of images, an estimated scene spectral reflectance, an estimated spectral power distribution of the scene, and one or more flash device settings, wherein the flash preview image approximates a brightness and a color appearance of a final image of the scene captured while the scene is illuminated by the flash device according to the one or more flash device settings. In addition, a user interface, which displays the preview image, allows a user to select an adjustment of a level of brightness and select a color adjustment before capturing the image, and the user interface provides information for appropriate flash adjustments for the capture.

In one embodiment, a method for simulating an image exposure comprises capturing a first set of images of a scene, wherein the first set of images is captured by a light sensor; calculating a scene spectral reflectance based on the first set of images; and generating a simulation image based on the first set of images, and one or more flash device settings, wherein the simulation image approximates a brightness and a color appearance of a final image of the scene captured while the scene is illuminated by the flash device according to the one or more flash device settings. In addition, the method further includes generating a user interface, which includes the simulation image, receiving one or more selections of brightness level adjustment and color adjustment via the user interface, and generating appropriate flash adjustments for capturing of an image of the scene based on received adjustments.

In one embodiment, one or more computer-readable media store instructions that, when executed by one or more computing devices, cause the one or more computing devices to perform operations comprising capturing a first set of images of a scene; and generating a flash preview image based on the first set of images, an estimated scene spectral reflectance, an estimated spectral power distribution of the scene, and one or more flash device settings, wherein the flash preview image approximates a brightness and a color appearance of a final image of the scene captured while the scene is illuminated by a flash device according to the one or more flash device settings. In addition, the operations includes generating an user interface that includes the flash preview image, wherein the user interface receives user adjustments of a level of brightness or of one or more colors, updating the flash preview image based on the received adjustments, and providing appropriate flash adjustments for an image capture.

This brief summary has been provided so that the nature of this disclosure may be understood more quickly. A more complete understanding can be obtained by reference to the following detailed description and to the attached drawings.

DESCRIPTION

The following disclosure describes certain explanatory embodiments. Additionally, the explanatory embodiments may include several novel features, and a particular feature may not be essential to practice the systems and methods described herein.

Figure 1:
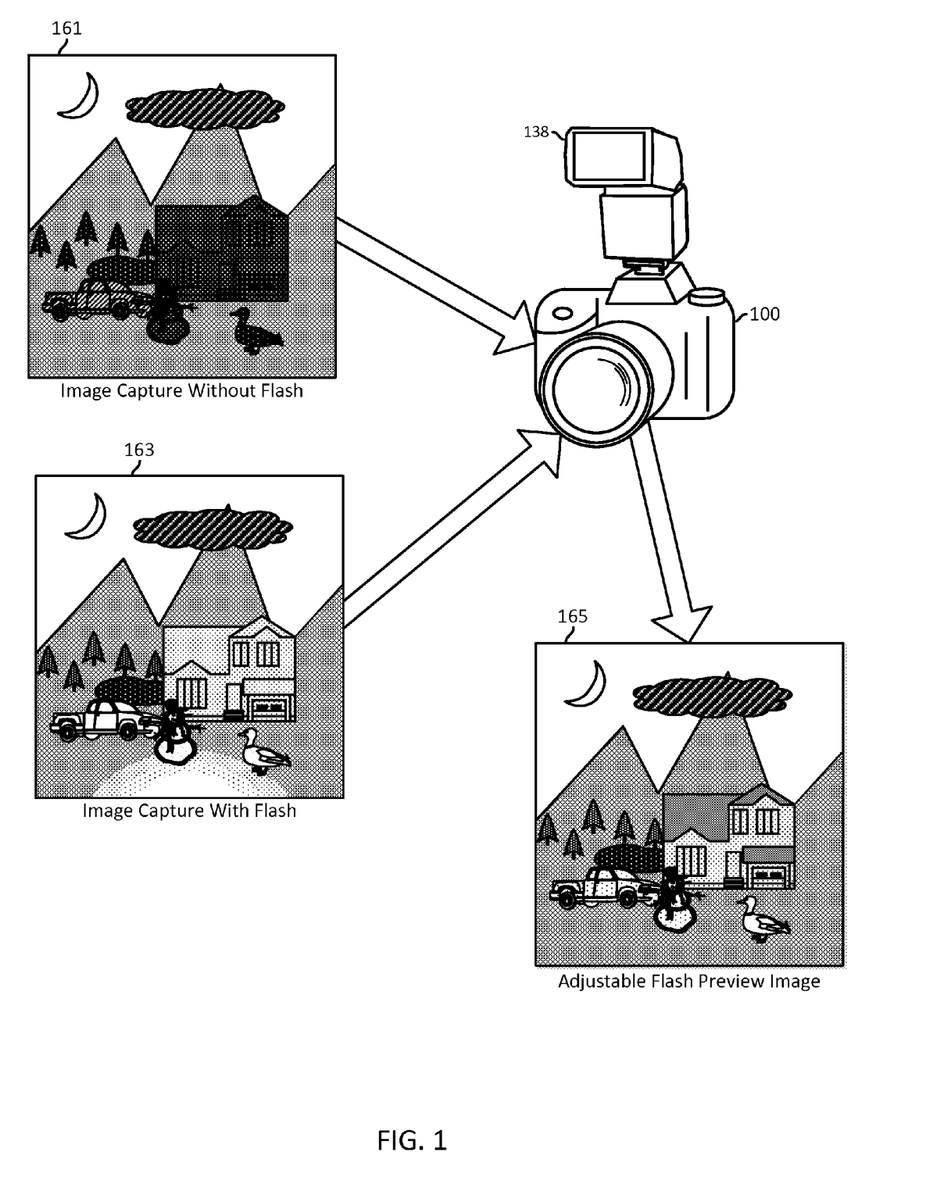
FIG. 1 illustrates an example embodiment of a camera generating an adjustable simulation of an image of a scene.

FIG. 1 illustrates an example embodiment of a camera 100 generating an adjustable simulation of an image 165 of a scene. The camera 100 captures an image of the scene without using a flash 161 (also referred to herein as "non-flash image 161"), and, using a flash device 138, captures an image of the scene using a flash 163 (also referred to herein as "flash image 163"). Based on the non-flash image 161 and the flash image 163, the camera 100 generates an adjustable simulation of an image 165 of the scene that shows estimated changes to the appearance of an image of the scene based on changes in one or more settings of the camera and the flash device 138.

For example, the camera 100 may presents a user interface (e.g., touch screen, buttons, dials, sliders) that allow a user to adjust a power setting (or other setting) of the flash device 138, and the camera may adjust the adjustable simulation of the image 165 to show an estimated appearance of the scene if an image of the scene was captured using the adjusted power setting of the flash device 138. Thus, the user may preview the appearance of an image of the scene if the image is captured while the flash device and/or camera are configured according to the settings, and the user may adjust the one or more settings until the preview image has a desired appearance. The user may then capture an image of the scene while the camera 100 and flash device 138 are configured to the one or more adjusted settings. The adjusted power setting may be sent to the flash device 138, allowing an image to be captured by the camera 100 while the flash device 138 is configured according to the adjusted power setting.

Therefore, a user can view a preview of the image (e.g., in a viewfinder or back panel LCD of the camera) that shows the simulated flash. The amount of simulated flash is selectable by the user. The user can then take an actual flash photo with the previously selected simulated flash output, and the camera 100 will command the flash to output the amount of light required to duplicate the simulated image.

The foregoing functionality can be implemented as follows. First, baseline scene data (in which the light from the flash "discounted") is estimated. The calculations may be performed in terms of wavelength integration, which implies that some spectral representation of the scene has to be estimated from digital signals. Spectral information is typically high-dimensional, and estimating spectral information from a number of channels that is much less than a number of wavelengths is an ill-posed inverse problem. It may be assumed that there is some prior information that is used to solve this inverse problem. The prior information could include, for example, shooting mode (e.g., portrait mode assumes a human face with a typical range of colors) and a statistical representation (e.g., eigenvectors) of the universe of spectral reflectances of scenes that are commonly imaged. These priors could be combined: for example, a portrait shooting mode may use a particular set of eigenvectors, and a landscape shooting mode uses a different set of eigenvectors. In addition to priors, data smoothing and regularization procedures may be used to condition the data.

In matrix representation, consider a scene with a scene spectral reflectance R with dimensions n×m'l, where n is the number of horizontal pixels, m is the number of vertical pixels, and l is the number of wavelengths. The matrix P is a diagonal matrix with dimensions l×l, in which the diagonal is the spectral power distribution of light shining onto the scene. The matrix S represents the spectral sensitivity of the imaging system (optics+imaging sensor) with dimensions l×c, where c is the number of channels of the imaging system. The digital signals D coming from the imaging system can be estimated by cascading these matrices: $D=R*P*S$. From matrix calculations the digital signals D have the dimensions n×m×c (n×m pixels by the number of channels c).

The spectral power distribution P could be subdivided in light without flash $P_O$ and light coming from flash $P_f$. Thus, there are digital signals without flash $D_O=R*P_o*S$ and digital signals with flash $D_f=R*(P_O+P_f)*S$. In order to add different amplitude levels of flash spectral power distribution $P_f$ (for example, $P_{f1}, P_{f2}, \ldots P_{ft}$, where t is the number of levels of flash spectral power distributions), R and $P_O$ must be estimated. S is assumed to be known. It is necessary to estimate R and $P_O$ from either $D_O$ or $D_f$ or a combination of $D_O$ and $D_f$. Following are two explanatory cases for R and $P_O$ estimation:

Case 1: Environmental spectral power distribution $P_O$ is very low (dark environment or very low light environment, such as a scene under moonlight). In this case, the signal coming from $D_O$ would be essentially noise, and $P_O$ can be neglected. R is unknown. The estimation of R is an inverse problem of estimating $R=D_f*pinv(P_f*S)$. In this example, Moore-Penrose pseudo-inverse transformation pinv is used, but any other inverse problem technique could be used. Alternatively, a set of eigenvectors E (with dimensions q*l, where q is the number of eigenvectors) may be used as a prior, and the coefficients of eigenvectors A (with dimensions n×m×q) may be estimated from digital signals according to $A=D_f*T$, where T is a pre-calculated transformation based on trained data (with dimensions c×q). Once the coefficients A are estimated, they are used to estimate $R=A*E$, and, once R is estimated, different levels of flash spectral power distribution are applied to simulate an illumination of the scene according to the different levels of flash spectral power distribution by calculating $D_{fi}=R*P_{fi}*S$, where i=1, 2, ..., t.

Case 2: The digital signals from the scene without the flash are above a threshold (e.g., a threshold of the signal-to-noise (SNR) level), and the spectral power distribution $P_O$ cannot be neglected. In this case there are two unknowns: R and $P_O$. Two equations are acquired by capturing images with and without a flash: $D_f=R*(P_O+P_f)*S$ and $D_O=R*P_O*S$. $D_f$ can be rewritten as $D_f=R*P_O*S+R*P_f*S$. From $D_O=R*P_O*S$, it is possible to derive $R*P_O=D_O*pinv(S)$. Substituting this into $D_f=R*P_O*S+R*P_f*S$ results in $D_f=D_O*pinv(S)*S+R*P_f*S=D_O+R*P_f*S$. The spectral reflectance R can be estimated as $R=(D_f-D_O)*pinv(P_f*S)$. Once the spectral reflectance R is calculated, the environmental spectral power distribution $P_O$ may be calculated according to the following equation: $P_O=pinv(R)*D_O*pinv(S)$. Once both the environmental spectral power distribution $P_O$ and the spectral reflectance R are determined, different levels of flash spectral power distribution $P_{fi}$ may be used to generate a simulation of an image of the scene $D_{fi}$ (also referred to herein as "simulated image $D_{fi}$") as the scene would appear if the scene was illuminated according to different levels of flash spectral power distribution $P_{fi}$ by calculating $D_{fi}=R*(P_O+P_{fi})*S$, where i=1, 2, ..., t. Also in case 2, a light intensity level (e.g., a light intensity level that is lower than the threshold in which flash would not be necessary (so flash is necessary), but high enough to have a meaningful signal $D_O$) could also be considered. A user interface that presents the simulated image $D_{fi}$ may include a preview image with a control (e.g., a slider bar that indicates intensity, a "+, −" adjustment to increase or decrease intensity, dials, a touch screen, gestures).

In some embodiments, based on scene analysis, the amount of default (e.g., optimally calculated) simulated flash output is shown in the viewfinder or a display on the camera. The user can alter the amount of flash output, and the camera can determine a bracketing that controls flash spectral power distribution or exposure to capture two or more pictures, and the camera can combine the images to get an image with optimal exposure. The optimization is a combination of digital gains in the channels of the imaging sensor and the intensity of the flash light. The optimization is based on the user rendering intent of the scene. As an explanatory embodiment, consider a case in which the relative colorimetry should be preserved for each level of flash.

To optimize, flash spectral power distribution $P_f$ is adjusted to a level that enables an SNR above a certain acceptable threshold (SNR_acceptable). $P_{fi}$ is adjusted until the SNR for $D_{fi}=R*(P_O+P_{fi})*S$ reaches SNR_acceptable. This defines the flash spectral power distribution $P_f$ level. Next, color is optimized.

Colorimetric reproduction includes preserving the ratio of colorimetric XYZ tristimulus values to a specific observer and under specific illumination by performing optimization of the flash intensity level(s) and/or channel gains. Once the scene spectral reflectance R is established, the intended XYZ values, represented by the matrix $XYZ_O$ with dimensions m×n×3, are calculated as $XYZ_O=K*R*Pillum*\overline{xyz}$, where K is a normalization coefficient, $\overline{xyz}$ is the color matching functions for a specific observer (CIE 2 or 10 degree observer) with dimensions l×3, and Pillum is the spectral power distribution of a standard illuminant (such as CIE A, D50, D65, F1, etc.). In addition, $XYZ_O$ can be decomposed into $X_O=K*R*Pillum*\overline{x}$, $Y_O=K*R*Pillum*\overline{y}$, and $Z_O=K*R*Pillum*\overline{z}$.

If digital signals (e.g., an image) have been acquired, corresponding tristimulus values for the digital signals may be calculated with the goal to preserve the ratio of $XYZ_O$. It is possible to determine a transformation to linearized digital signals such that $D_O=V*XYZ_O$, where V is a c*3 transformation. V can be calculated by calibration. For example, images may be captured of targets that have known spectral reflectances (R) under illuminants with known spectra power distributions S. XYZ may be calculated by integrating R,S with color matching functions. The transformation V is then calculated by relating XYZs to the corresponding digital signals D. Thus, for the final digital signals, $D_f = V * XYZ_f$. The relationship between the intended digital signals $D_{fi}$ and the imaging parameters can be decomposed for channel c as follows: $D_{fic} = R * (P_o + P_{fic}) * S_c$, where $D_{fc}$ is the signal from channel c, $P_{fc}$ is the flash spectral power distribution for channel c, and $S_c$ is the sensitivity from the signal of channel c.

Consider a case in which there are red, green, and blue trichromatic channels. In that case, the digital signals for the red, green, and blue channels for the original capture without flash are, respectively, $D_O\_red = R * P_O * S_{red}$, $D_O\_green = R * P_O * S_{green}$, and $D_O\_blue = R * P_O * S_{blue}$, where $S_{red}, S_{green}$, and $S_{blue}$ are respectively the spectral sensitivities of the red, green, and blue channels. The final digital signals for red, green and blue channels should be, respectively, $D_f\_red = R * (P_f + P_O) * S_{red\_new}$, $D_f\_green = R * (P_f + P_O) * S_{green\_new}$, and $D_f\_blue = R * (P_f + P_O) * S_{blue\_new}$. Thus, $S_{red\_new} = pinv(R * (P_f + P_O)) * D_f\_red$, $S_{green\_new} = pinv(R * (P_f + P_O)) * D_f\_green$, and $S_{blue\_new} = pinv(R * (P_f + P_O)) * D_f\_blue$. By calculating $S_{red\_new}, S_{green\_new}$, and $S_{blue\_new}$ it is possible to estimate what modifications (g_red, g_green, and g_blue) to apply to the original $S_{red}, S_{green}$, and $S_{blue}$ spectral sensitivities. If g_red, g_green, and g_blue are constant vectors, a scalar gain is sufficient to correct color. However, if these vectors are not constant, a computational adaptive procedure may be applied, either by changing the color of the flash (e.g., a change in the flash spectral distribution $P_f$, for example a flash that includes controllable LEDs that can emit light with different spectral content), by adjusting an imaging sensor with tunable spectral sensitivities, and/or by applying specific tunable filtering in the optical path of the imaging system.

Figure 2:
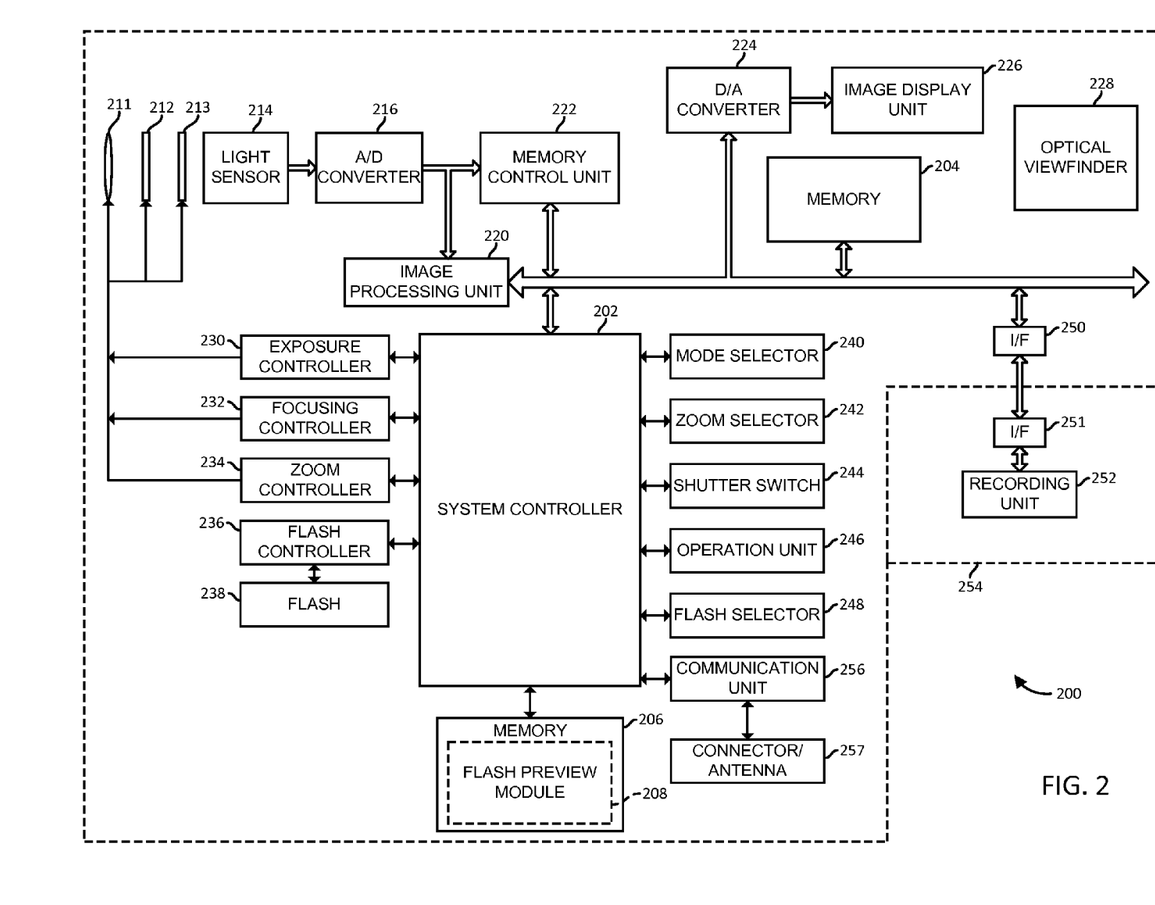
FIG. 2 is a block diagram that illustrates an example embodiment of a system for generating an adjustable simulation of an image.

FIG. 2 is a block diagram that illustrates an example embodiment of a system for generating an adjustable simulation of an image. The system 200 includes a lens 211 (which may include a plurality of lenses and/or a microlens array), an aperture 212 (which may include a plurality of apertures, for example a multi-aperture array), a shutter 213, and a light sensor 214 (which may include a plurality of light sensors) that converts incident electromagnetic radiation (also referred to herein as "light") into electrical signals. Furthermore, in other embodiments the lens 211, the aperture 212, and the shutter 213 may be arranged differently than is shown in the embodiment of FIG. 2.

Light reflected from a scene (e.g., an object in the scene) passes through the lens 211, the aperture 212, and the shutter 213 (when open) to the light sensor 214 and may form an optical image on a light sensing surface of the light sensor 214. The light sensor 214 converts incident light to analog or digital image signals and outputs the signals to an ND converter 216 (in embodiments where ND conversion is necessary). The ND converter 216 converts analog image signals to digital image signals. The light sensor 214 may detect (which may include sampling or measuring) light in the spectrum visible to the human eye and/or in the spectrum invisible to the human eye (e.g., infrared, x-ray, ultraviolet).

The light sensor 214 may be tunable to sample light at specified wavelengths, and the range of sampled wavelengths and/or the increments between the sampled wavelengths may be adjusted (e.g., made finer or coarser) to capture more or less information about the different wavelengths of light reflected by an object. Thus, rather than detect only a sum total intensity of all light received, the light sensor 214 may be able to capture the intensity of the discrete component wavelengths of the light. For example, the light sensor 214 may sample light at 400-460 nm, 470-530 nm, 530-590 nm, 600-660 nm, and at 670-730 nm, and the detected light may be separately recorded by the system 100 for each range of sampled wavelengths. Or, for example, light may be sampled in a range of 40 nm with an increment of 10 nm between samples from 400 nm to 600 nm (e.g., 400-440 nm, 450-490 nm, 500-540 nm, and so forth).

The system 200 also includes an image processing unit 220, which applies resize processing, such as interpolation, reduction, and color conversion processing, to data from the A/D converter 216, data from the light sensor 214, and/or data from a memory 204.

Output data from the ND converter 216 is written in the memory 204, for example via the image processing unit 220 and/or memory control unit 222. The memory 204 is configured to store image data that is captured by the light sensor 214 and/or converted into digital data by the A/D converter 216. The memory 204 may store images (e.g., still photos, videos) and other data, for example metadata and file headers, for captured images. The memory 204 may also serve as an image display memory. A D/A converter 224 converts digital data into an analog signal and supplies that analog signal to an image display unit 226. The image display unit 226 renders images according to the analog signal from the D/A converter 224 on a display (e.g., an LCD, an LED display, an OLED display, a plasma display, a CRT display), though some embodiments may provide the digital data to the display unit 226 without converting the digital data to analog data. The image display unit 226 is configured to show an adjustable simulation of an image captured using the flash 238. The system 200 also includes an optical viewfinder 228 (which may be an SLR viewfinder) that presents at least part of the view detected by the light sensor 214.

An exposure controller 230 controls the shutter 213 (e.g., how long the shutter 213 is open). A flash controller 236 has a flash exposure compensation function that links with a flash 238 (e.g., a flash emission device), and also controls the settings of the flash 238. A focusing controller 232 controls the size of the aperture 212, and a zoom controller 234 controls the angle of view of the lens 211. The exposure controller 230, focusing controller 232, and zoom controller 234 may each partially control the lens 211, the aperture 212, and the shutter 213, and may collaborate to calculate settings for the lens 211, the aperture 212, and the shutter 213.

A memory 206 (as well as the memory 204) includes one or more computer readable and/or writable media, and may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM, an EPROM, an EEPROM), etc. The memory 206 may store computer-executable instructions and data. The system controller 202 includes one or more central processing units (e.g., microprocessors) and is configured to read and perform computer-executable instructions, such as instructions stored in the memory 206. Note that the computer-executable instructions may include those for the performance of various methods described herein. The memory 206 is an example of a non-transitory computer-readable medium that stores computer-executable instructions thereon.

The memory 206 includes a flash preview module 208. A module includes computer-readable instructions that may be executed by one or more members of the system 200 (e.g., the system controller 202) to cause the system 200 to perform certain operations, though for purposes of description a module may be described as performing the operations. Modules may be implemented in software (e.g., JAVA, C, C++, C#, Basic, Assembly), firmware, and/or hardware. In other embodiments, the system 200 may include additional or less modules, the modules may be combined into fewer modules, or the modules may be divided into more modules. The instructions in the flash preview module 208 may be executed to cause the system 200 to generate one or more adjustable simulations of an image captured using the flash 238 and/or perform one or more methods described herein. Modules may be implemented in any applicable computer-readable storage medium that can supply the computer-executable instructions. Furthermore, when the computer-executable instructions are executed, an operating system executing on the system 200 may perform at least part of the operations that implement the instructions.

The system 200 also includes a mode selector 240 that sets the operation mode of the system 200 to still image recording mode, video recording mode, playback mode, etc. A zoom selector 242 is operable to change the angle of view (zooming magnification or shooting magnification). The zoom selector 242 may include, for example, a slide-type member, a lever, a switch, a wheel, a knob, and/or a switch.

A shutter switch 244 may generate a first shutter switch signal upon a half stroke. Also, the shutter switch 244 may generate a second shutter switch signal upon a full stroke. The system controller 202 may start one or more operations (e.g., AF processing, AE processing, AWB processing, EF processing) in response to the first shutter switch signal. Also, in response to the second shutter signal, the system controller 205 may perform and/or initiate one or more operations, including capturing an image.

The operation unit 246 may include various buttons, touch panels, and so on. In one embodiment, the operation unit 246 includes one or more of a menu button, a set button, a macro selection button, a multi-image reproduction/repaging button, a single-shot/serial shot/self-timer selection button, a forward (+) menu selection button, a backward (−) menu selection button, etc. The operation unit 246 may set the system 200 to a plural-image shooting mode, wherein a plurality of images is captured in response to a single shooting instruction (e.g., a signal from the shutter switch 244). This may include auto bracketing, wherein one or more image capturing parameters (e.g., white balance, exposure, aperture settings) are altered in each of the images.

The system 200 also includes a flash selector 248, which may include various buttons, touch panels, joysticks, wheels, levers, etc., and may navigate through one or more menus. The flash selector 248 may be operated to select one or more flash settings, including an overall brightness and a respective power output for one or more color channels.

The recording media 254 includes a recording unit 252 that includes one or more computer-readable and/or computer-writable media. The system 200 and the recording media 254 communicate via an interface 250 of the system 200 and an interface 251 of the recording media 254. Although the illustrated embodiment of the system 200 includes one pair of interfaces 250, 251 and one recording media 254, other embodiments may include additional recording media and/or interfaces.

Additionally, a communications unit 256 is configured to communicate with other devices, for example via wired communication (e.g., USB, IEEE 1394, P1284, SCSI, modem, LAN, RS232C) and/or wireless communication (e.g., Bluetooth, WiFi). A connector/antenna 257 can connect the system 200 to other systems and devices via a wired connection and/or communicate wirelessly with other systems and devices.

Figure 3:
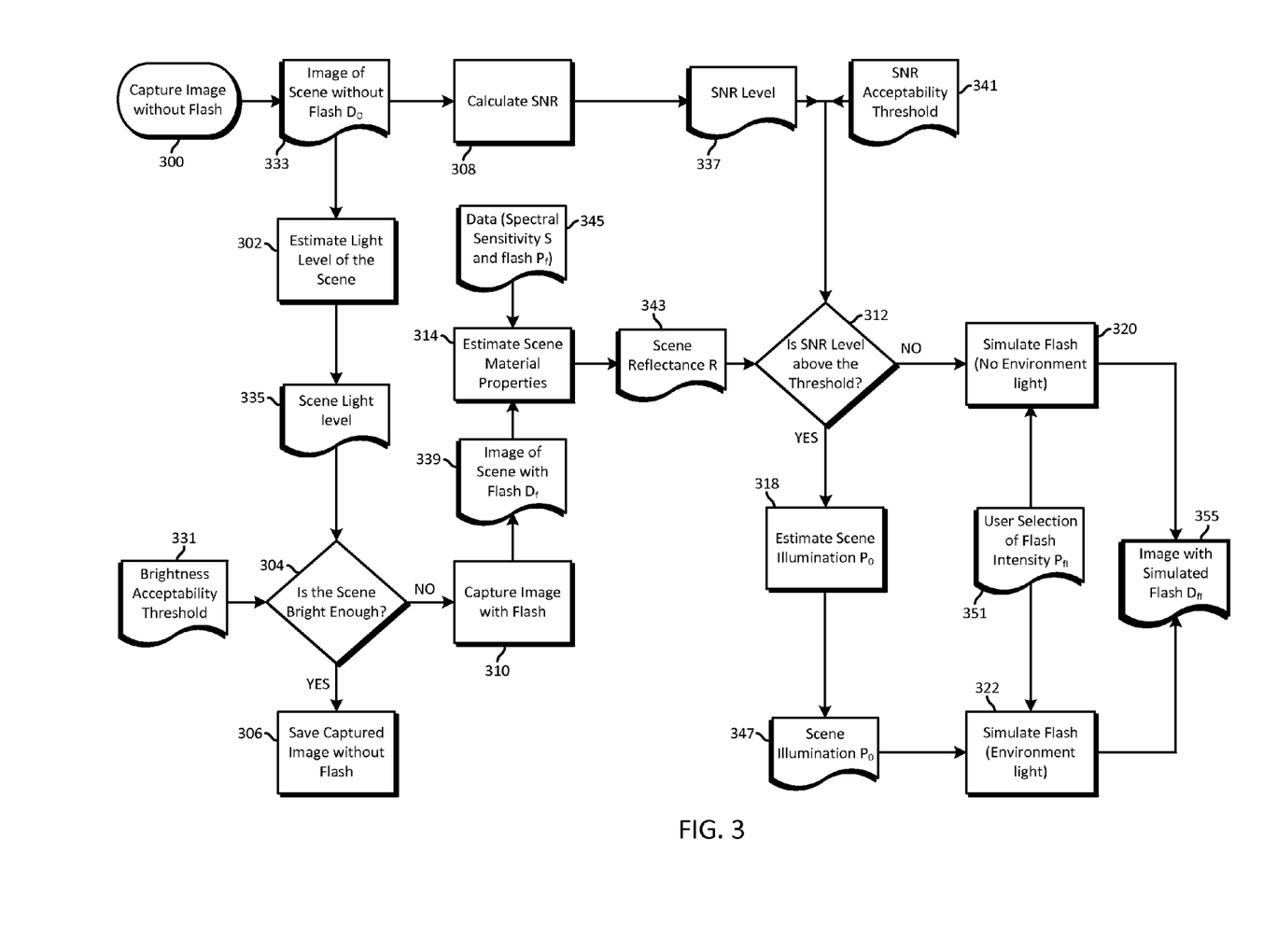
FIG. 3 illustrates example embodiments of methods for generating an adjustable simulation of an image exposure.

FIG. 3 illustrates example embodiments of methods for generating an adjustable simulation of an image exposure. Other embodiments of this method and the other methods described herein may omit blocks, add blocks, change the order of the blocks, combine blocks, and/or divide blocks into separate blocks. Additionally, one or more components of the systems and devices described herein may implement the method shown in FIG. 3 and the other methods described herein.

In FIG. 3, flow starts in block 300, where an image of a scene without a flash $D_O$ 333 is captured (also referred to herein as the "image without flash $D_O$ 333"), where $D_O=R*P_O*S$. Flow proceeds to block 302 and block 308. In block 308, the signal to noise ratio ("SNR") level 337 of the image without flash $D_O$ 333 is calculated. Flow then moves to block 312.

In block 302, the scene light level 335 is estimated. Next, in block 304, it is determined if the scene is bright enough based on a brightness acceptability threshold 331 and the scene light level 335. If the scene is determined to be bright enough, flow proceeds to block 306, where the image without flash $D_O$ 333 is saved. If the scene is determined to not be bright enough in block 304, flow proceeds to block 310. In block 310, an image of the scene of the scene is captured while illuminated by the flash $D_f$ 339 (also referred to herein as the "image with flash $D_f$ 339"), where $D_f=R*(P_o+P_f)*S$. In some embodiments, multiple images of the scene are captured while illuminated by the flash, where the flash is set to different settings for each image. Flow then proceeds to block 314.

In block 314, a scene reflectance R 343 (e.g., scene material properties) is estimated based on the image with flash $D_f$ 339 (or the plurality of images with flash), the image without flash $D_O$ 333, and data 345 describing the spectral sensitivity S of the imaging system and the flash spectral power distribution $P_f$. The scene reflectance R 343 may be generated according to $R=(D_f-D_O)*pinv(P_f*S)$. Next, in block 312, it is determined if the SNR level is above the SNR acceptability threshold 341. If not, this indicates if the scene illumination is so low that it is negligible, and flow proceeds to block 320. If yes, then the scene illumination will be considered, and flow proceeds to block 318 (discussed in paragraph [0045]). If flow proceeds to block 320, in block 320 an image with a simulated flash $D_{fi}$ 355 is generated based on the scene reflectance R, the spectral sensitivity S of the imaging system, and a user selection of flash spectral power distribution $P_{fi}$ 351, for example according to $D_{fi}=R*P_{fi}*S$.

If flow proceeds to block 318, in block 318 the environmental spectral power distribution $P_O$ 347 is estimated based on the scene reflectance R 343 and the data 345 describing the spectral sensitivity S and the flash spectral power distribution $P_f$. The scene environmental spectral power distribution $P_O$ 347 may be determined according to $P_O=pinv(R)*D_O*pinv(S)$. Next, in block 322, an image with a simulated flash $D_{fi}$ 355 is generated based on the scene reflectance R, the spectral sensitivity S of the imaging system, a user selection of flash spectral power distribution $P_{fi}$ 351, and the environmental spectral power distribution $P_O$, for example according to $D_{fi}=R*(P_o+P_{fi})*S$.

The user selection of flash spectral power distribution $P_{fi}$ 351 may be adjusted by a user via a user interface (e.g., the user interface shown in FIG. 5) and/or a flash selector 248. The image with a simulated flash $D_{fi}$ 355 may be revised in response to receiving a new selection of the flash spectral power distribution $P_{fi}$ 351. Thus, a user may preview an image of the scene as the scene would appear while illuminated according to different flash spectral power distributions $P_{fi}$ 351, where i=1, 2, ..., t.

Figure 4:
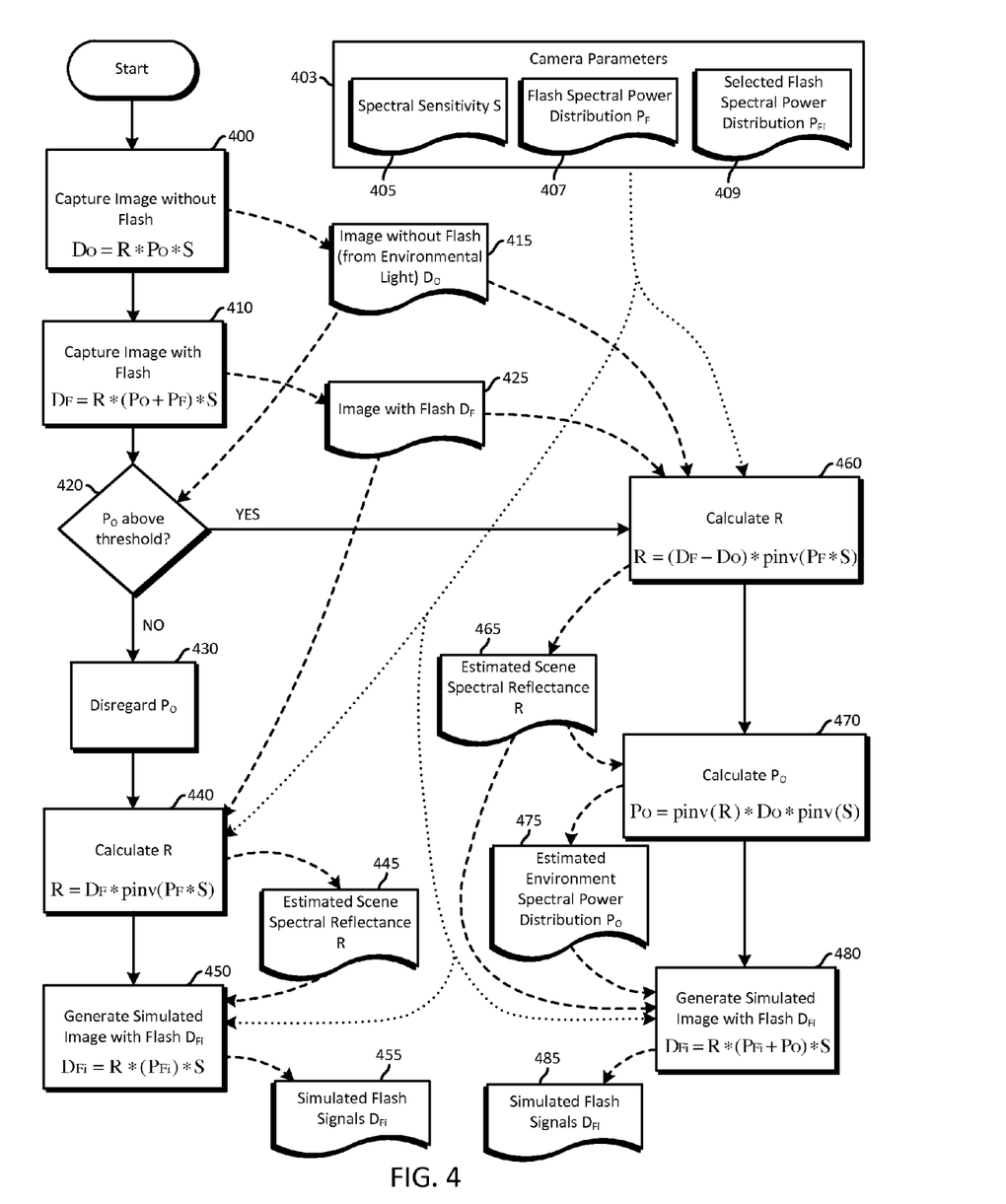
FIG. 4 illustrates example embodiments of methods for generating an adjustable simulation of an image exposure.

FIG. 4 illustrates example embodiments of methods for generating an adjustable simulation of an image exposure. Flow starts and proceeds to block 400, where an image without flash $D_O$ 415 is captured (i.e., an image of a scene is captured without using a flash) where $D_O=R*P_O*S$, and thus the scene is illuminated by environmental light $P_O$ and not by a light from a flash. Next, in block 410, an image with flash $D_f$ 425 is captured (i.e., an image of the scene is captured using a flash) where $D_f=R*(P_O+P_f)*S$, and thus the scene is illuminated by environmental light $P_O$ and by a light from a flash $P_f$. Additionally, the camera parameters 403 are known, and include the spectral sensitivity of the imaging system S 405 and the flash spectral power distribution $P_f$ 407.

Flow proceeds to block 420, where it is determined if the environmental light $P_O$ is above a threshold. If not, flow proceeds to block 430, and if yes, flow proceeds to block 460. In block 440, an estimated scene spectral reflectance R 445 is calculated based on the spectral sensitivity of the imaging system S 405, the flash spectral power distribution $P_f$ 407, and the image with flash $D_f$ 425, for example according to $R=D_f*pinv(P_f*S)$. Flow then proceeds to block 450, where a simulated image with flash $D_{fi}$ is generated based on the estimated scene spectral reflectance R 445, the spectral sensitivity of the imaging system S 405, and a selected flash spectral power distribution $P_{fi}$ 409, for example according to $D_{fi}=R*P_{fi}*S$.

If flow proceeds to block 460, in block 460 an estimated scene spectral reflectance R 465 is calculated based on the spectral sensitivity of the imaging system S 405, the flash spectral power distribution $P_f$ 407, the image with flash $D_f$ 425, and the image without flash $D_O$ 415, for example according to $R=(D_f-D_O)*pinv(P_f*S)$. Next, in block 470, an estimated environmental spectral power distribution $P_O$ 475 is calculated based on the estimated scene spectral reflectance R 465, the spectral sensitivity of the imaging system S 405, and the image without flash $D_O$ 415, for example according to $P_O=pinv(R)*D_O*pinv(S)$.

Flow then proceeds to block 480, where a simulated image with flash $D_{fi}$ 485 is generated based on the estimated scene spectral reflectance R 465, the spectral sensitivity of the imaging system S 405, the estimated environmental spectral power distribution $P_O$ 475, and a selected flash spectral power distribution $P_{fi}$ 409, for example according to $D_{fi}=R*(P_{fi}+P_O)*S$.

Figure 5:
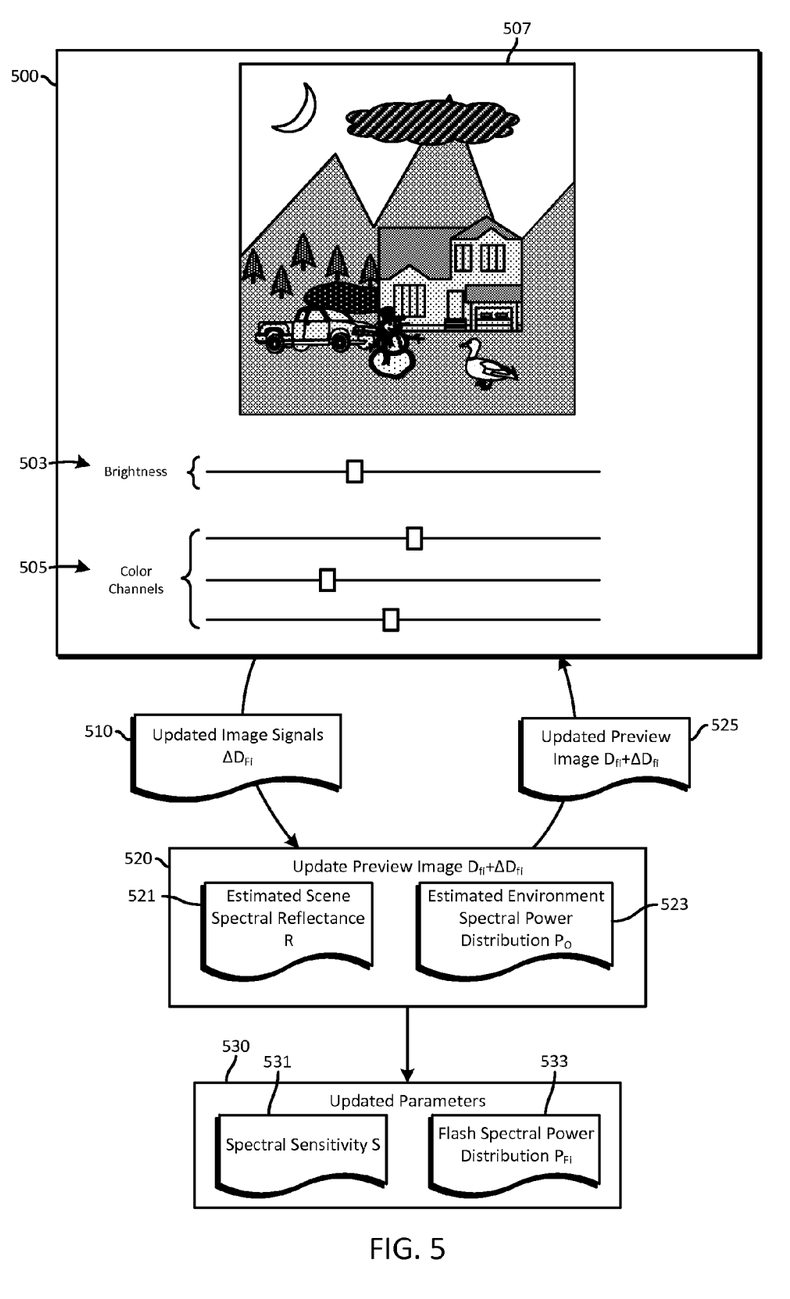
FIG. 5 illustrates an example embodiment of a user interface.

FIG. 5 illustrates an example embodiment of a user interface 500. The user interface includes a viewing area 507 that displays a preview image, a brightness control 503, and color channel controls 505. Though slider bars are shown in this embodiment, other embodiments may use other forms for the controls. A user can adjust the brightness and or color channels of the image displayed in the viewing area 507, and the user interface 500 generates updated image signals $\Delta D_{fi}$ 510 based on the user adjustments. The updated image signals $\Delta D_{fi}$ 510 are sent to a computing device (e.g., camera, a smartphone, a laptop, a desktop, a server), which, in block 520 updates the preview image to generate an updated preview image $D_{fi}+\Delta D_{fi}$ 525 based on the prior preview image $\Delta D_{fi}$. The updated preview image $D_{fi}+\Delta D_{fi}$ 525 is sent to the user interface 500, which displays the updated preview image $D_{fi}+\Delta D_{fi}$ 525 in the viewing area 507. The updates may happen in or substantially in real time to provide a user feedback about the effect of changes to one or more of the brightness and color channels on the appearance of the preview image.

Also, in block 520 updated parameters 530, which include spectral sensitivity S and/or the flash spectral power distribution $P_{fi}$, are generated based on one or more of the estimated scene spectral reflectance R 521, the estimated environmental spectral power distribution $P_O$ 523, the updated image signals $\Delta D_{fi}$ 510, the prior preview image $\Delta D_{fi}$, and the updated preview image $D_{fi}+\Delta D_{fi}$ 525. The updated parameters 530 are sent to a camera and/or flash device, which may use the updated parameters 530 to capture an image.

Figure 6:
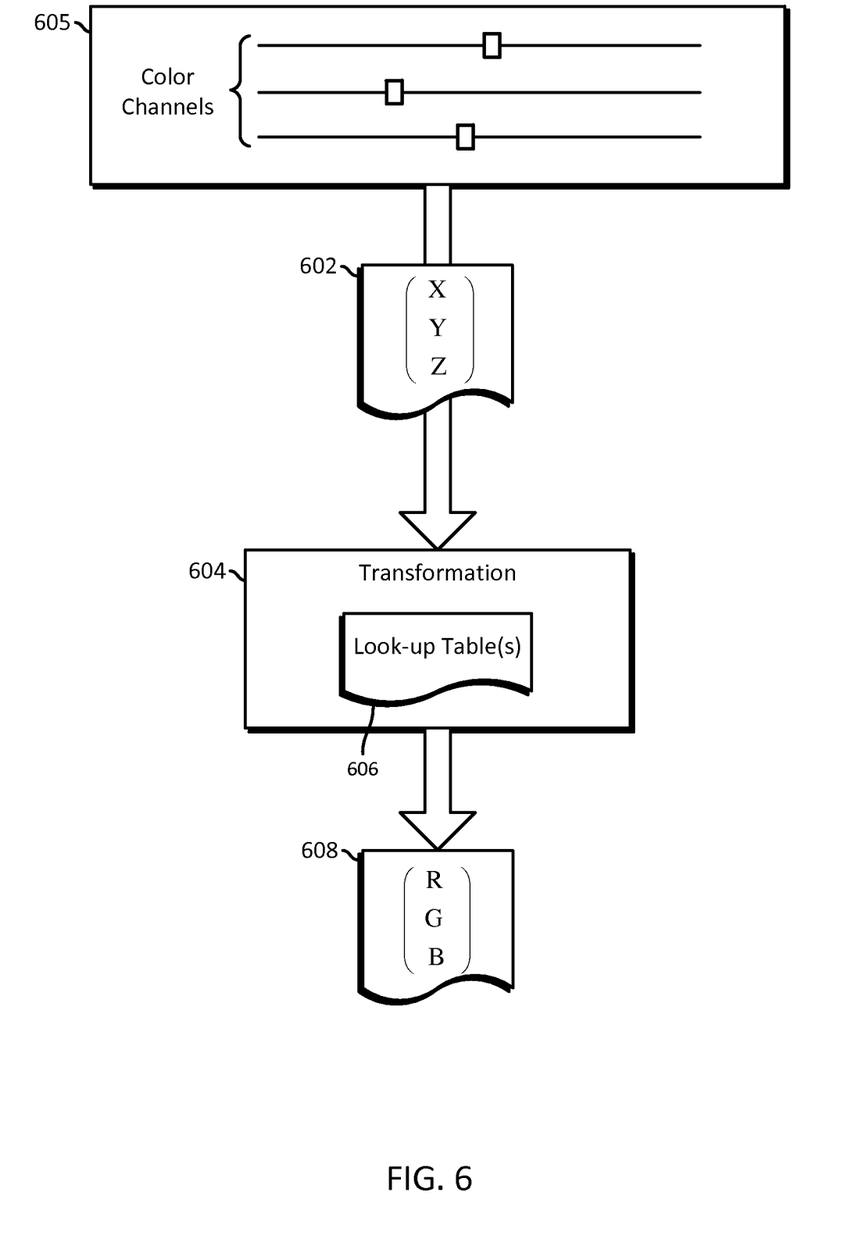
FIG. 6 illustrates an example embodiment of the conversion of XYZ tristimulus values color values to RGB color values.

FIG. 6 illustrates an example embodiment of the conversion of XYZ tristimulus values color values to RGB color values. In response to inputs, the color channel controls 605 generate XYZ tristimulus values 602. The XYZ tristimulus values 602 undergo a transformation 604 to convert them into RGB color values 608. The transformation 604 is based on one or more look-up tables 606, that map XYZ tristimulus values to RGB color values.

Figure 7:
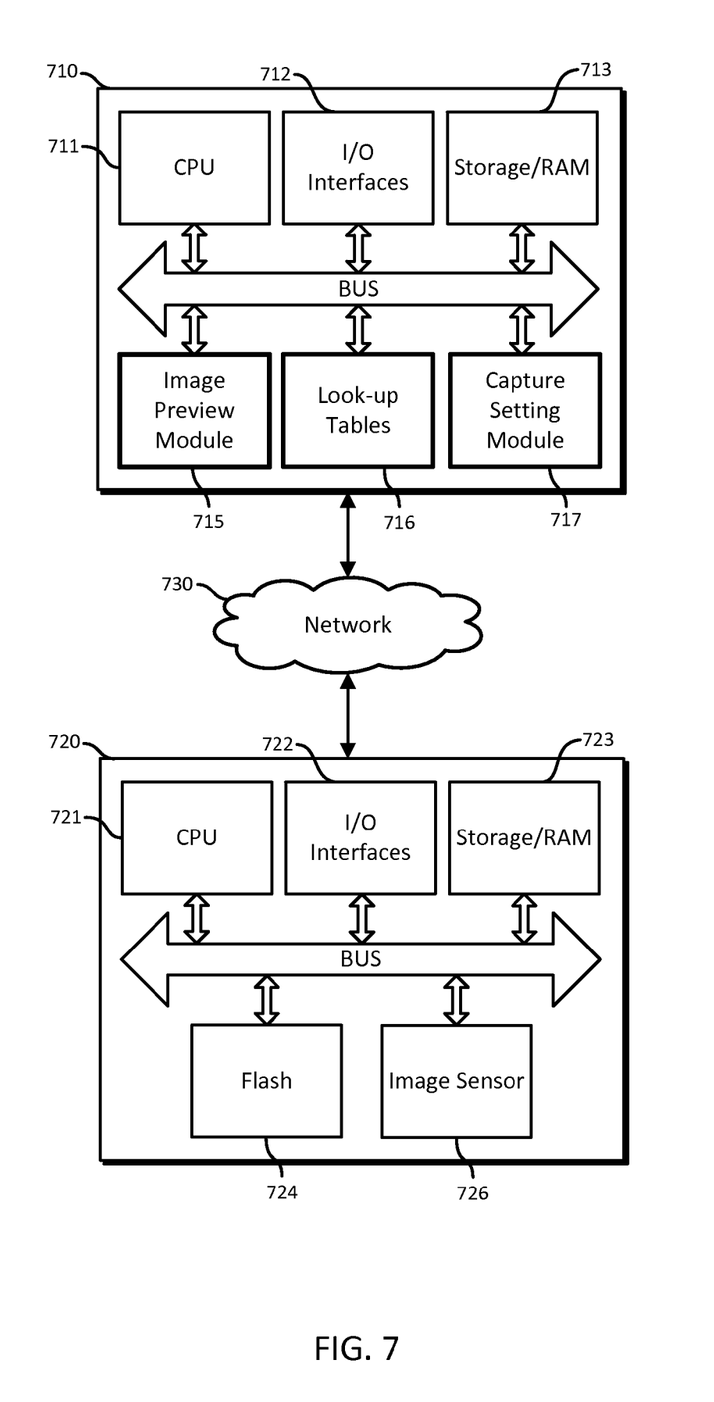
FIG. 7 is a block diagram that illustrates an example embodiment of a system for generating an adjustable simulation of an image exposure.

FIG. 7 is a block diagram that illustrates an example embodiment of a system for generating an adjustable simulation of an image exposure. The system includes an image preview device 710 and an image capture device 720, both of which include computing devices (e.g., a desktop computer, a server, a PDA, a laptop, a tablet, a phone, a digital camera). The image preview device 710 includes one or more processors (CPUs) 711, I/O interfaces 712, and storage/RAM 713. The CPUs 711 includes one or more central processing units (e.g., microprocessors) and are configured to read and perform computer-executable instructions, such as instructions stored in modules. Note that the computer-executable instructions may include those for the performance of various methods described herein. The I/O interfaces 712 provide communication interfaces to input and output devices, which may include a keyboard, a display device, a mouse, a printing device, a touch screen, a light pen, an optical storage device, a scanner, a microphone, a camera, a drive, and a network (either wired or wireless).

Storage/RAM 713 includes one or more computer readable and/or writable media, and may include, for example, one or more of a magnetic disk (e.g., a flexible disk (floppy disk), a hard disk, redundant array of independent disks (RAID)), an optical disc (e.g., CD, DVD, Blu-ray), a magneto-optical disk, a micro-drive, a read only memory (ROM), solid state memory (e.g., random access memory (RAM), DRAM, SRAM, flash memory, video RAM (VRAM), a nonvolatile memory card), erasable programmable read only memory (EPROM), electrically erasable programmable read only memory (EEPROM), a magnetic tape or card, and an optical card. Storage/RAM 713 may store computer-readable data and/or instructions. The members of the image preview device 710 communicate via a bus.

The image preview device 710 also includes an image preview module 715, look-up tables 716, and a capture setting module 717. The image preview module 715 generates a simulated image based on input images (e.g., an image without flash $D_O$ and an image with flash $D_f$) and one or more brightness and color channel settings. The image preview module 715 generates the simulated image based one or more of the scene reflectance R, the spectral sensitivity S of the imaging system, a user selection of flash spectral power distribution $P_{fi}$, and the environmental spectral power distribution $P_O$.

The image preview device 710 is configured to use the look-up tables 716 to map XYZ tristimulus values to RGB color values and/or map RGB color values to XYZ tristimulus values. Also, the capture setting module 717 generates updated settings for a flash and/or an imaging system's spectral sensitivity based on one or more of the simulated image based, the scene reflectance R, the previous spectral sensitivity S of the imaging system, a user selection of flash spectral power distribution $P_{fi}$, and the environmental spectral power distribution $P_O$.

The image capture device 720 includes a CPU 722, storage/RAM 723, and I/O interfaces 722. The object storage device also a flash 724 and an image sensor 726. The image sensor 726 is configured to capture images based on one or more settings. The flash 724 is configured to emit light according to one or more flash settings. The image sensor 726 and/or the flash 724 implement the settings generated by the capture setting module 717 to capture images of a scene.

The above described devices, systems, and methods can be achieved by supplying one or more storage media having stored thereon computer-executable instructions for realizing the above described operations to one or more computing devices that are configured to read the computer-executable instructions stored in the one or more storage media and execute them. In this case, the systems and/or devices perform the operations of the above-described embodiments when executing the computer-executable instructions read from the one or more storage media. Also, an operating system on the one or more systems and/or devices may implement the operations of the above described embodiments. Thus, the computer-executable instructions and/or the one or more storage media storing the computer-executable instructions therein constitute an embodiment.

Any applicable computer-readable storage medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a storage medium for the computer-executable instructions. The computer-executable instructions may be written to a computer-readable storage medium provided on a function-extension board inserted into the device or on a function-extension unit connected to the device, and a CPU provided on the function-extension board or unit may implement the operations of the above-described embodiments.

This disclosure has provided a detailed description with respect to particular explanatory embodiments. It is understood that the scope of the appended claims is not limited to the above-described embodiments and that various changes and modifications may be made without departing from the scope of the claims.

What is claimed is:

1. An image capturing device comprising:
    a display unit configured to display an image;
    a light sensor configured to capture a first image of a scene while the scene is illuminated by a flash device according to first flash device settings and to capture a second image of the scene while the scene is not illuminated by the flash device; and
    one or more processors configured to cause the device to
        estimate a scene spectral reflectance of the scene based on the first image;
        estimate a spectral power distribution of the scene based on the first image and the second image, wherein the spectral power distribution includes a first spectral power component corresponding to illumination of the flash device and a second spectral power component corresponding to environmental light of the scene;
        calculate a signal-noise ratio of the second image; and
        generate a flash preview image that approximates an image captured while the scene is illuminated by the flash device according to second flash device settings different from the first flash device settings and that is to be displayed by the display unit, based on the estimated scene spectral reflectance, the estimated spectral power distribution, and the second flash device settings,
    wherein the device does not use the second spectral power component to generate the flash preview image when the signal-noise ratio of the second image is lower than a predetermined threshold, and uses both the first spectral power component and the second spectral power component when the signal-noise ratio of the second image is higher than the predetermined threshold.

2. The image capturing device of claim 1, wherein generating the flash preview image comprises generating respective digital signal value estimates for two or more color channels.

3. The image capturing device of claim 1, wherein the flash preview image is further based on a spectral sensitivity of the light sensor.

4. The image capturing device of claim 1, wherein, in response to receiving one or more updated flash device settings, the one or more processors are further configured to modify the flash preview image to approximate a brightness and a color appearance of a final image of the scene captured while the scene is illuminated by a flash device according to the one or more updated flash device settings.

5. The image capturing device of claim 4, wherein, in response to receiving a user input to approve the modified flash preview image, the light sensor captures a third image of the scene while the scene is illuminated by the flash device according to the one or more updated flash device settings.

6. A method for simulating an image exposure, the method comprising:
    capturing a first image of a scene while the scene is illuminated by a flash device according to first flash device settings and capturing a second image of the scene while the scene is not illuminated by the flash device, wherein the first image and the second image are captured by a light sensor;
    estimating a scene spectral reflectance of the scene based on the first image;
    estimating a spectral power distribution of the scene based on the first image and the second image, wherein the spectral power distribution includes a first spectral power component corresponding to illumination of the flash device and a second spectral power component corresponding to environmental light of the scene;
    calculating a signal-noise ratio of the second image; and
    generating a flash preview image that approximates an image captured while the scene is illuminated by the flash device according to second flash device settings different from the first flash device settings and that is to be displayed by a display unit, based on the estimated scene spectral reflectance, the estimated spectral power distribution, and the second flash device settings, wherein the second spectral power component is not used to generate the flash preview image when the signal-noise ratio of the second image is lower than a predetermined threshold, and both the first spectral power component and the second spectral power component are used when the signal-noise ratio of the second image is higher than the predetermined threshold.

7. The method of claim 6, wherein the second spectral power component is estimated based on the first image, the second image, the scene spectral reflectance, and a spectral sensitivity of the light sensor.

8. One or more non-transitory computer-readable media storing instructions that, when executed by one or more computing devices, cause the one or more computing devices to perform operations comprising:
   capturing a first image of a scene while the scene is illuminated by a flash device according to first flash device settings and capturing a second image of the scene while the scene is not illuminated by the flash device, wherein the first image and the second image are captured by a light sensor;
   estimating a scene spectral reflectance of the scene based on the first image;
   estimating a spectral power distribution of the scene based on the first image and the second image, wherein the spectral power distribution includes a first spectral power component corresponding to illumination of the flash device and a second spectral power component corresponding to environmental light of the scene;
   calculating a signal-noise ratio of the second image; and
   generating a flash preview image that approximates an image captured while the scene is illuminated by the flash device according to second flash device settings different from the first flash device settings and that is to be displayed by a display unit, based on the estimated scene spectral reflectance, the estimated spectral power distribution, and the second flash device settings, wherein the second spectral power component is not used to generate the flash preview image when the signal-noise ratio of the second image is lower than a predetermined threshold, and both the first spectral power component and the second spectral power component are used when the signal-noise ratio of the second image is higher than the predetermined threshold.

9. The one or more non-transitory computer-readable media of claim 8, wherein the operations further comprise generating a user interface that displays the flash preview image and that display controls for adjusting a brightness of the flash preview image and adjusting one or more color channels of the flash preview image.

10. The one or more non-transitory computer-readable media of claim 9, wherein the operations further comprise referencing a look-up table to map an adjustment of the brightness of the flash preview image or an adjustment of one or more color channels of the flash preview image to one or more adjustments of flash device settings.

11. An image capturing device comprising:
    a display unit configured to display an image;
    a light sensor configured to capture a first image of a scene while the scene is illuminated by a flash device according to first flash device settings and to capture a second image of the scene while the scene is not illuminated by the flash device; and
    one or more processors configured to cause the device to
       estimate a scene spectral reflectance of the scene based on the first image;
       estimate a spectral power distribution of the scene based on the first image and the second image, wherein the spectral power distribution includes a first spectral power component corresponding to illumination of the flash device and a second spectral power component corresponding to environmental light of the scene; and
       generate a flash preview image that approximates an image captured while the scene is illuminated by the flash device according to second flash device settings different from the first flash device settings and that is to be displayed by the display unit, based on the estimated scene spectral reflectance, the estimated spectral power distribution, and the second flash device settings, wherein the device does not use the second spectral power component to generate the flash preview image when the second spectral power component is smaller than a predetermined threshold, and uses both the first spectral power component and the second spectral power component when the second spectral power component is larger than the predetermined threshold.

12. The image capturing device of claim 11, wherein the device does not use the second image to estimate the scene spectral reflectance when the second spectral power component is smaller than the predetermined threshold and uses both the first image and the second image to estimate the scene spectral reflectance when the second spectral power component is larger than the predetermined threshold.

13. A method for simulating an image exposure, the method comprising:
    capturing a first image of a scene while the scene is illuminated by a flash device according to first flash device settings and capturing a second image of the scene while the scene is not illuminated by the flash device, wherein the first image and the second image are captured by a light sensor;
    estimating a scene spectral reflectance of the scene based on the first image;
    estimating a spectral power distribution of the scene based on the first image and the second image, wherein the spectral power distribution includes a first spectral power component corresponding to illumination of the flash device and a second spectral power component corresponding to environmental light of the scene; and
    generating a flash preview image that approximates an image captured while the scene is illuminated by the flash device according to second flash device settings different from the first flash device settings and that is to be displayed by a display unit, based on the estimated scene spectral reflectance, the estimated spectral power distribution and the second flash device settings, wherein the second spectral power component is not used to generate the flash preview image when the second spectral power component is smaller than a predetermined threshold, and both the first spectral power component and the second spectral power component are used when the second spectral power component is larger than the predetermined threshold.

14. One or more non-transitory computer-readable media storing instructions that, when executed by one or more computing devices, cause the one or more computing devices to perform operations comprising:
    capturing a first image of a scene while the scene is illuminated by a flash device according to first flash device settings and capturing a second image of the scene while the scene is not illuminated by the flash device, wherein the first image and the second image are captured by a light sensor;
    estimating a scene spectral reflectance of the scene based on the first image;
    estimating a spectral power distribution of the scene based on the first image and the second image, wherein the spectral power distribution includes a first spectral power component corresponding to illumination of the flash device and a second spectral power component corresponding to environmental light of the scene;

generating a flash preview image that approximates an image captured while the scene is illuminated by the flash device according to second flash device settings different from the first flash device settings and that is to be displayed by a display unit, based on the estimated scene spectral reflectance, the estimated spectral power distribution, and the second flash device settings, wherein the second spectral power component is not used to generate the flash preview image when the second spectral power component is smaller than a predetermined threshold, and both the first spectral power component and the second spectral power component are used when the second spectral power component is larger than the predetermined threshold.

* * * * *